United States Patent [19]
Marcelle et al.

[11] Patent Number: 5,517,424
[45] Date of Patent: May 14, 1996

[54] STEAM TURBINE FUZZY LOGIC CYCLIC CONTROL METHOD AND APPARATUS THEREFOR

[75] Inventors: Kenneth A. W. Marcelle; Kenneth H. Chiang; Paul K. Houpt; Piero P. Bonissone, all of Schenectady, N.Y.; Joseph Weiss, Cupertino, Calif.

[73] Assignee: Electric Power Research Institute, Inc.

[21] Appl. No.: 221,746

[22] Filed: Mar. 31, 1994

[51] Int. Cl.[6] ........................................... H02J 3/12
[52] U.S. Cl. .................... 364/494; 395/900; 395/907; 307/39; 60/645; 290/52
[58] Field of Search ........................ 364/492, 494; 60/660, 646, 645; 376/217; 395/3, 61, 900, 906, 907; 307/38–41; 290/52

[56] References Cited

U.S. PATENT DOCUMENTS

| | | | |
|---|---|---|---|
| 4,792,911 | 12/1988 | Gonzalez et al. | 364/551 |
| 5,305,230 | 4/1994 | Matsumoto et al. | 364/495 |
| 5,309,485 | 5/1994 | Chao | 364/215 |
| 5,311,421 | 5/1994 | Nomura et al. | 364/157 |
| 5,392,320 | 2/1995 | Chao | 376/215 |
| 5,433,079 | 7/1995 | Badami et al. | 60/660 |

OTHER PUBLICATIONS

Mamdani E. H., et al., "Application of fuzzy algorithms for control of simple dynamic plant," *Proceedings of IEE: Control & Science, vol. 121, No. 12*, Dec. 1974, pp. 1585–1588.

Matsumoto, H., et al., "An operation support expert system based on on–line dynamics simulation and fuzzy . . .," *IEEE Trans. on Energy Conversion., vol. 8, No. 4*, Dec. 1993, pp. 674–680.

A. Khotanzad, R.–C. Hwang, and D. Maratukulam, "Hourly Load Forecasting by Neural Networks," in *IEEE Power Engineering Society Winter Meeting*, (Columbus, OH), Feb. 1993.

A. F. Armor, R. D. Hottenstein, I. A. Diaz–Tous, and N. F. Lansing, "Cycling Capabilty of Supercritical Turbines: A World Wide Assessment," in *Fossil Plant Cycling Workshop*, (Miami Beach, FL), 1985.

F. J. Hanzalek and P. G. Ipsen, "Boiler–Turbine Coordination during Startup and Loading of Large Units," in *American Society of Mechanical Engineers*, (Chicago, IL), Nov. 7–11, 1965.

J. Jelinek, "Cycling controllers for electric utilities," in *EPRI Conference on Power Plan Controls and Automation*, 1989.

K. Anderson, "Advanced control technology to reduce power plant stress," in *ASME Publication, Paper #90–JPGC/Pwr–2*, Boston, MA, Oct. 1990.

(List continued on next page.)

*Primary Examiner*—Emanuel T. Voeltz
*Assistant Examiner*—Kyle J. Choi
*Attorney, Agent, or Firm*—Flehr, Hohbach, Test, Albritton & Herbert

[57] ABSTRACT

A method for automated control of a steam turbine during cyclic operation includes the steps of comparing current turbine loading with an anticipated load profile to generate a load error signal. Anticipated electrical load profiles correspond to the time of day, day of the week, month of the year, and historical data; operator input can vary such historical profiles as appropriate for unusual situations. The predicted load profile is categorized with respect to selected composite electrical load cycle profiles; weighted operating constraints are generated by means of a fuzzy inference calculation using electrical cycle profiles selected to correspond to the anticipated electrical load profile. Control signals for selected steam plant regulatory functions, such as steam supply valve position and boiler pressure, are produced by applying the fuzzy logic-generated weighted operating constraints and the load error signal so as to optimize turbine load-following efficacy, steam plant efficiency, and machinery stress reduction. These control signals are then applied to respective regulatory function actuators in the steam plant to implement the desired trajectory of steam plant operation.

27 Claims, 3 Drawing Sheets

OTHER PUBLICATIONS

D. B. P. Gibbs, "Nonlinear model predictive control for fossil power plants," in *Proc. American Control Conf.,* pp. vol. 4, pp. 3091–3098, Chicago, IL, Jun. 1992.

D. P. B. P. Gibbs, D. S. Weber, "Application of nonlinear model–based predictive control to fossil power plants," in *Proc. 30th IEEE Conf. on Decision and Control, Dec. 1992.*

H. F. Martin and J. G. J. Silvestri, "Turbine Cycle Performance Optimization," in *EPRI Heat Rate Improvement Conference,* (Richmond, VA), May 10–12 (1988).

C. C. Lee, "Fuzzy Logic in Control Systems: Fuzzy Logic Controller I and II," *IEEE Systems, Man, and Cybernetics,* vil. 20, No. 2, 1990.

C. E. Garcia and A. Morshedi, "Quadratic Programming Solution of Dynamic Matrix Control (QDMC)." *Chem. Eng. Comun.,* vol. 46, pp. 073–087, 1986.

STEAM TURBINE FUZZY LOGIC CYCLIC CONTROL METHOD AND APPARATUS THEREFOR

BACKGROUND OF THE INVENTION

Electric utilities must be prepared to meet the demand for electrical power at all times. Load profiles for most utilities indicate a cyclic load, with demand for electric power typically varying with the time of the day, day of the week, and month of the year. Based upon historical load profile data, anticipated electrical demand can be predicted with a reasonable degree of certainty. The minimum electrical power demand is referred to as the base load and demand above the base load is referred to as peaking load. It is not uncommon for peaking loads to be double the base load during some periods of the load profile.

To meet peaking load demand, some power plants are load-cycled to follow large percentage load changes, while the base load is supplied by other plants running continuously at their rated megawatt output. Large fossil-fueled steam power plants, traditionally used for supplying base load, are increasingly being used to meet peaking power demand due to the use of less expensive power from nuclear units and power from cogeneration units to provide the base load.

Steam turbines used in electrical power plants typically have been designed for optimal operation in a particular range of steady state conditions. Cycling a steam turbine to meet peaking load can induce large thermal stresses in both the turbine and the boiler as a result of steep steam-to-metal temperature gradients that develop during rapid loading or unloading of the turbine. These elevated stress levels reduce equipment service life and increase maintenance costs. Turbine rotor stress is the most critical of these stresses and maximum rotor stress limits are often used to define the fastest load cycling rates.

Current cycling control systems for steam turbines do not use stress minimization as an explicit objective and generally operate the turbine at the rotor stress limit to provide good load following. Further, conventional turbine controllers typically rely on algorithms that optimize turbine load following and performance over only a single load change as opposed to over an extended load profile that includes several load changes. Such conventional controllers typically rely either on adjusting steam supply to the turbine (e.g., controlling a throttle valve to the turbine), or alternatively, on changing boiler pressure as the means for controlling generated power.

It is advantageous to operate the steam turbine system in a manner that both provides good load tracking and that minimizes stress on the system components. It is also desirable to operate the system in a manner to most efficiently convert the energy consumed by the thermal source to electrical energy.

It is thus an object of this invention to provide a steam turbines generator control system that provides cyclic turbine control with good load following and stress minimization.

It is a further object of this invention to provide a steam turbine-generator control system that provides economical long term cyclic turbine operation with the use of extended time horizons for prediction of turbine loading profiles.

SUMMARY OF THE INVENTION

In accordance with this invention, a method for cyclic operation control of a steam turbine employs fuzzy logic and includes the steps of categorizing anticipated turbine load profiles with respect to selected electrical-load cycle profiles and then producing control signals for selected steam plant regulatory functions by means of a fuzzy inference calculation in accordance with the categorization of anticipated turbine loading with respect to selected electrical-load cycle profiles. The fuzzy inference calculation provides weighted operating constraints so that turbine operation is optimized with respect to plant load following efficacy, steam plant efficiency, and machinery stress criteria. The steam plant regulatory function control signals comprise a steam supply valve control signal (e.g., a throttle control for steam admitted to the turbine) and a steam pressure control signal (e.g., control of the thermal source to alter system steam pressure). In generating the steam plant control signals, the method of the present invention optimizes these control signals to minimize load tracking error and to minimize turbine inlet temperature changes. The generated steam plant control signals are then applied to respective actuators in the steam plant to implement the control orders in plant operation.

The selected electrical-load cycle profiles include a constant load cycle profile and a ramping load cycle profile. Each constant load cycle profile comprises a constant load stage followed by a ramping load stage, and each ramping load cycle profile comprises a first ramping load stage followed by a constant load stage that is in turn followed by a second ramping load stage. Thus any anticipated turbine loading profile can be broken down into components comprising one or more selected electrical load cycle profries. In the method of this invention, the fuzzy inference calculation is used to assign a weight to each of the following operating constraints for a selected load profile: load tracking, turbine temperature fluctuation, steam control valve movement, and steam pressure change. In addition, for each constant load stage, the method of this invention further includes the steps of generating a target steam pressure for the endpoint of the constant load stage and a prioritization weight on reaching the target steam pressure prior to the endpoint of the constant load stage.

An apparatus for providing the above described cyclic control includes a boiler controller having means for adjusting the steam pressure delivered to the turbine; a steam supply control apparatus coupled to the turbine so as to selectively control the amount of steam admitted into the turbine; and a steam plant cyclic controller coupled to the boiler controller and the steam supply control apparatus. The steam plant cyclic controller includes processing means for generating control signals for the boiler controller and the steam supply apparatus so that selected steam plant operation parameters, such as high plant load following efficacy and low machinery stress, are optimized with respect to an anticipated turbine loading profile through the use of a fuzzy inference calculation.

BRIEF DESCRIPTION OF THE DRAWINGS

The features of the invention believed to be novel are set forth with particularity in the appended claims. The invention itself, however, both as to organization and method of operation, together with further objects and advantages thereof, may best be understood by reference to the following description in conjunction with the accompanying drawings in which like characters represent like parts throughout the drawings, and in which:

DETAILED DESCRIPTION OF THE INVENTION

Figure 1:
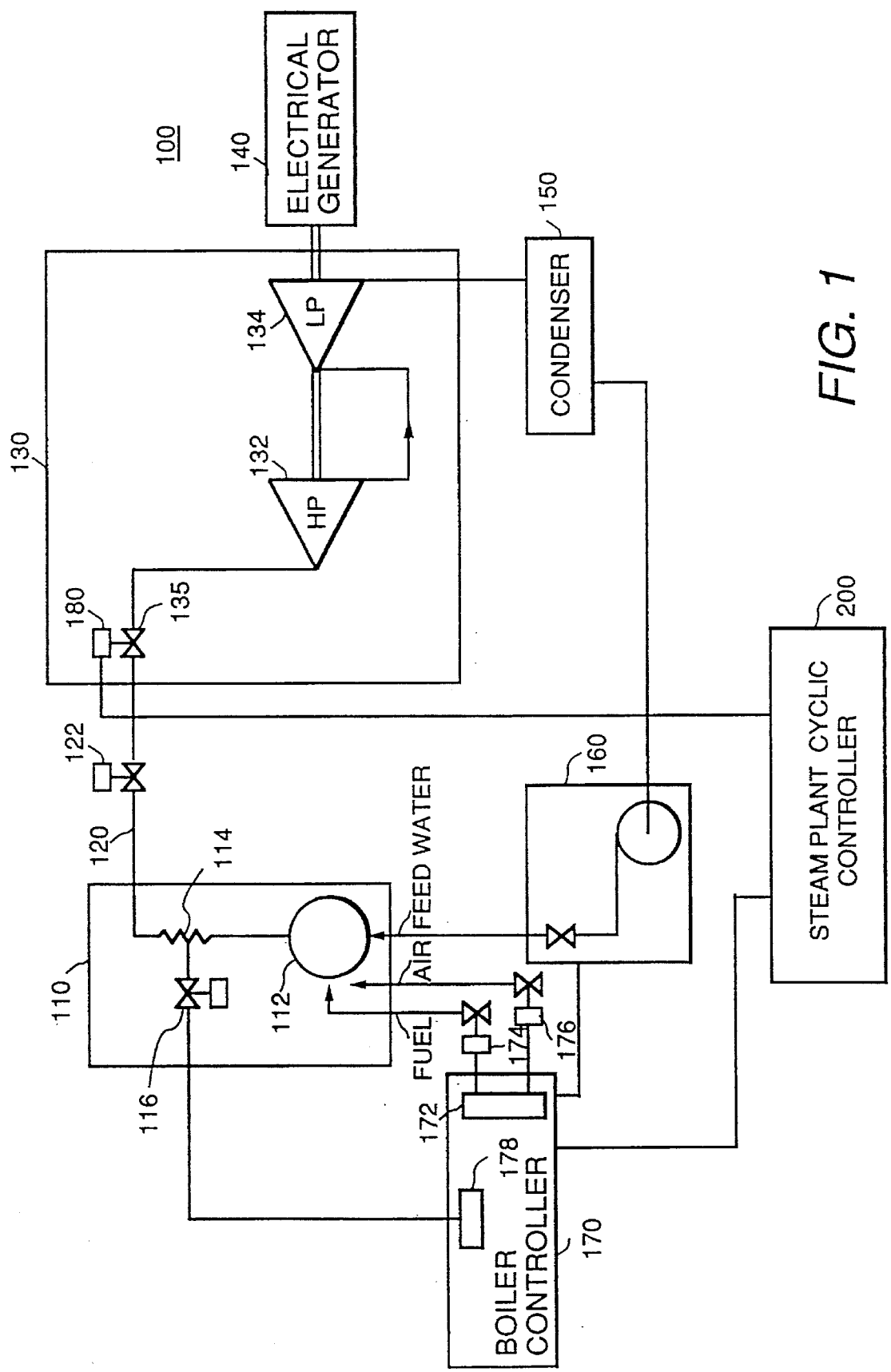
FIG. 1 is a schematic diagram of steam plant having a steam turbine-generator and that is adapted to be cyclically operated in accordance with the method of the present invention.

A steam plant 100 used in the generation of electricity commonly comprises a steam generator 110 coupled via steam piping 120 to deliver steam to a steam turbine 130, which in turn is mechanically coupled to turn an electrical generator 140. Steam generator 110 typically comprises a steam drum 112, in which water is converted to steam by heat from a thermal energy source such as an oil or coal-fired burner, and a superheater 114. The steam passes from steam generator 110 through a main steam valve 122 to, for example, steam turbine 130 which typically comprises a high pressure turbine 132 and a low pressure turbine 134, in which energy in the steam is extracted. Steam that has passed through turbine 130 is exhausted to a condenser 150 in which the steam is condensed and the resulting water is typically fed back into the steam generator via a boiler feed assembly 160.

The energy necessary to drive turbine 130 varies as the load changes on electrical generator 140. One means of controlling the energy supplied to turbine 130 is with a steam supply control valve 135 (for purposes of illustration, valve 135 is shown in the common arrangement as a turbine control valve, although the control valve can alternatively be placed in steam piping 120 between turbine 130 and steam generator 110).

Another method of controlling the energy supplied to turbine 130 is by adjusting steam pressure with a boiler controller 170. In most steam generating systems superheated steam is used, and turbine steam inlet pressure and temperature are decoupled by attemperators and superheaters in the steam system. Nonetheless, the method of the present invention is readily adapted to use in a saturated steam system and thus the term "adjusting steam pressure and temperature" is used in the broadest sense, covering both saturated steam systems (in which control of one determines the value of the other) and superheated systems (in which the temperature and pressure are independently variable, within limits). For example, controller 170 comprises a boiler combustion controller 172 that is coupled to a fuel supply 174 and an air supply 176; controller 170 typically also comprises a superheater controller 178 coupled to a superheater spray control valve 116 so that boiler operation can be controlled to provide a desired boiler steam pressure independent of steam temperature (within limits or over some range of pressure as is known in the art).

In accordance with this invention, cyclic operation of steam plant 100 is controlled with a method adapted to control both the turbine steam supply (e.g., via throttle valve 135) and the steam pressure passing from steam generator 110. As used herein, "cyclic operation" refers to operation of steam plant 100 after it has been started up and is ready for responding to varying loads on electrical generator 140.

A steam plant cyclic controller 200 is coupled to boiler controller 170 and steam supply valve 135 so as to control turbine 130 through a combination of positioning control valve 135 and setting steam system pressure through boiler controller 170. These two modes of steam plant control are commonly referred to as fixed steam pressure control and sliding steam pressure control. In fixed pressure control turbine throttle (or governor) valve 135 is used to control turbine power output as boiler pressure is nominally kept constant. In sliding pressure control, turbine throttle valve 135 is nominally kept fully open and the power output of the turbine is controlled by varying boiler pressure. Fixed pressure control allows fast load changes to be followed but can result in large thermal stress to the turbine rotor as a result of steam temperature fluctuation at the turbine inlet. Sliding pressure control induces less turbine thermal stress but also exhibits much slower load following response as a result of the large inertias that must be overcome to alter the saturation conditions in the boiler.

Figure 2:
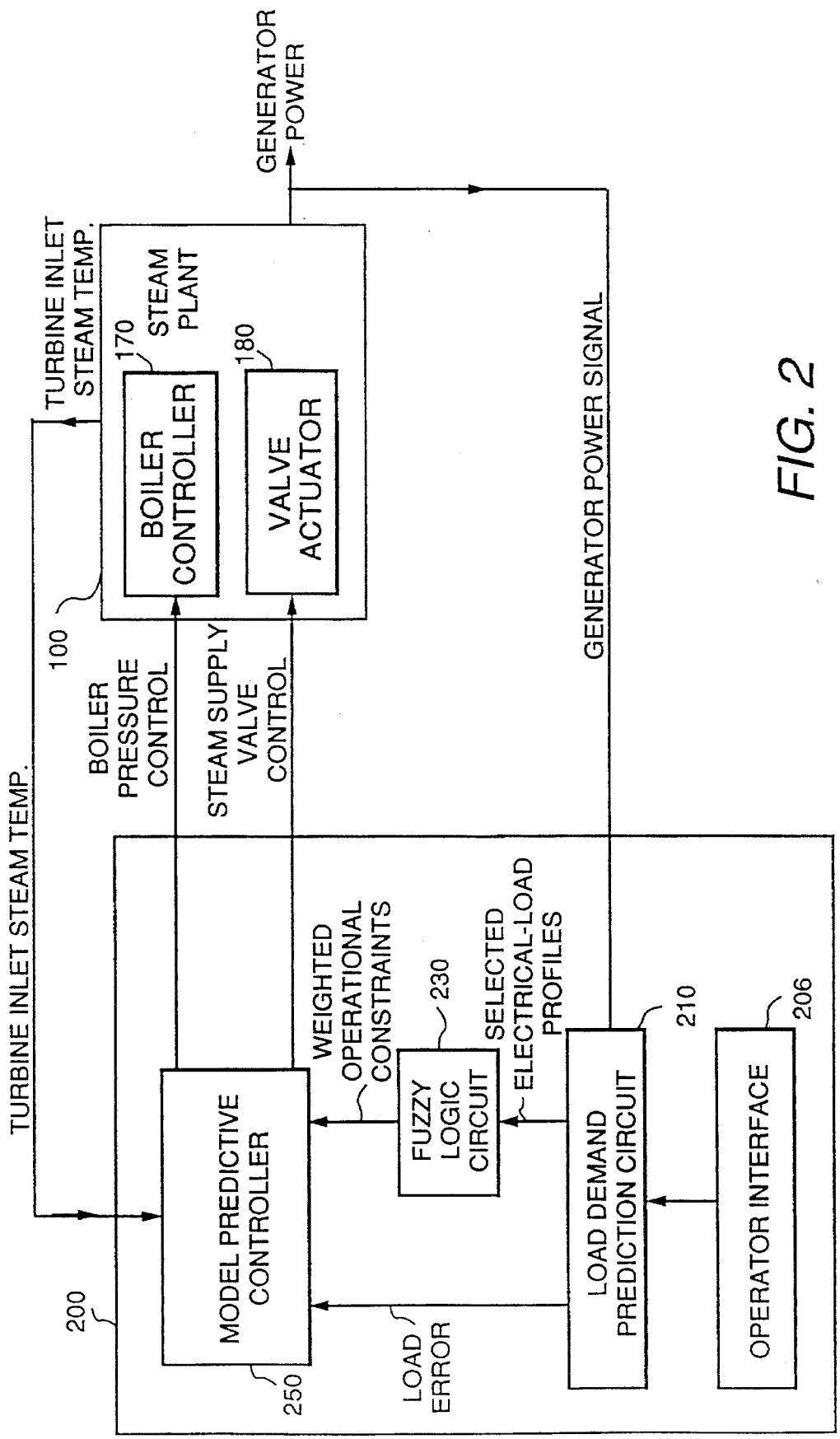
FIG. 2 is a block diagram illustrating the steam turbine cyclic operation control architecture used in accordance with the method of this invention.

A block diagram of the cyclic control architecture of controller 200 that provides the method of this invention is illustrated in FIG. 2. Controller 200 comprises a load demand prediction circuit 210, and operator interface 206, a fuzzy logic circuit 230, and a model predictive controller 250 which are coupled together as described below in order to generate the steam plant control signals that will provide desired plant response to the anticipated electrical load profile.

Controller 200 is coupled to steam plant 100 so as to receive a generator power output signal and a turbine inlet steam temperature signal. Controller 200 is further coupled to operator interface 206 so as to receive an operator interface signal therefrom. The operator interface signal can be used by the operator to update electrical-load profiles as necessary or appropriate in light of emergent load demand situations. Operator interface 206 is typically a computer or the like that also allows the operator to monitor operation of steam system 100 and controller 200.

Load demand prediction circuit 210 is coupled to steam plant 100 and operator interface 206 to receive, respectively, the generator power signal and the operator interface signal. Load demand prediction circuit 210 comprises memory and timing circuits (not illustrated in the block diagram) from which it can generate anticipated load profiles based upon selected factors. Appropriate anticipated electrical-load profiles are chosen in load demand prediction circuit 210 based on time of day, day of the week, month of the year, and historical data, or alternatively, as dictated by operator interface 206 (such as would be necessary in an abnormal situation of heightened demand as a result of weather conditions or the like, or of reduced electrical power supply as when casualties limit baseline generating capacity). Further, the anticipated load profile is categorized with respect to an anticipated load change and the next load change thereafter (following an intermediate constant load period). Such categorization provides one or more selected composite electrical load cycle profiles that are used to describe the anticipated turbine loading profiles.

Load demand prediction circuit 210 is coupled to model predictive controller 250 and to fuzzy logic controller 230. Load demand prediction circuit 210 generates a load error signal based on a comparison of the projected turbine loading and the current turbine loading; the load error signal is supplied to model predictive controller 250. The selected electrical load profiles are supplied to the fuzzy logic controller 230, which is in turn coupled to provide its fuzzy logic output (e.g., as in this invention, weighted operational constraints) to model predictive controller 250. Model predictive controller 250 additionally is coupled to receive a turbine steam inlet temperature signal.

Model predictive controller 250 generates a boiler pressure control signal and a steam supply valve control signal. Controller 250 is coupled to deliver the pressure control signal to boiler controller 170 and to deliver the steam supply valve control signal to a respective valve actuator 180. The desired optimal steam plant control is thus implemented through the control signals delivered to respective actuators in steam plant 100.

In accordance with the method of this invention, future load demand profiles are considered when determining the current steam plant control action. Optimal future performance is therefore not jeopardized by focusing only on short term demand, and the possibility that current modes of operation will result in future constraint limited operation (e.g., operation of the plant limited by maximum allowable turbine stress, or the like) is reduced.

Fuzzy logic controller 230 comprises a fuzzy logic knowledge base that encodes the steam plant operator's rules-of-thumb for establishing priority among conflicting performance objectives when following a given load profile. This knowledge base provides the long term guidance for overall cycling cost minimization by generating weighted operating constraints used by the model predictive controller to optimize the trade off between good load following and equipment stress minimization during cyclic operation of the steam plant. Model predictive controller 250 also ensures that hard system constraints, such as maximum safe operating pressure, turbine stress limits, or valve closure rates are not violated.

Each selected composite electrical-load profile that is used in the fuzzy inference calculation to generate the weighted operational constraints comprises sequential constant load stages and ramping load stages. These stages correspond to certain phases of the anticipated turbine load, such as load increases or decreases and constant load periods. Constant load stages are defined by the amount of the load and the temporal duration of the constant load stage. A ramping load stage is defined by the load change (the amount of an increase or decrease in load) and the rate of the change. For purposes of this invention, two types of composite load profiles are used: a ramping load cycle profile and a constant load cycle profile. Ramping load cycle profiles contain information on a current load change, a follow-on constant load stage, and the next succeeding load change. Constant load cycles contain information on a current constant load stage and a follow-on load change.

Figure 3B:
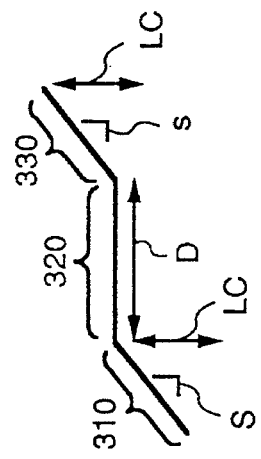
FIGS. 3(A)–3(F) represent examples of composite electrical load profiles used in the fuzzy inference calculation in accordance with the method of the present invention.
Figure 3D:
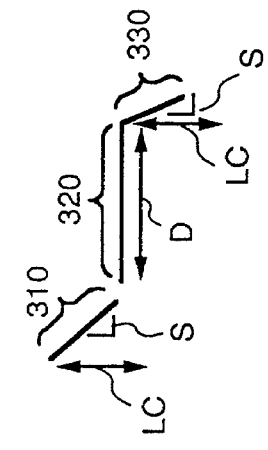
Figure 3F:
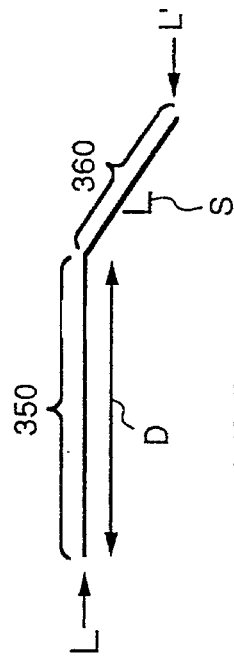
Figure 3A:
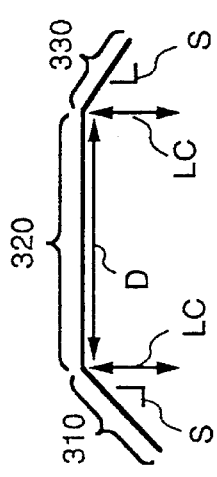
Figure 3C:
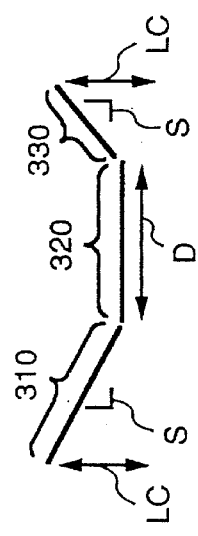
Figure 3E:
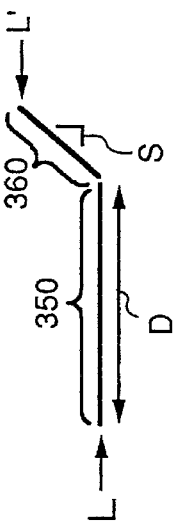

Ramping load cycle profiles comprise an "up-flat-down" profile (illustrated in FIG. 3(A)); an "up-flat-up" profile (FIG. 3(B)); a "down-flat-up" profile (FIG. 3(C)); and an "up-flat-up" profile (FIG. 3(D)). Each ramping load cycle profile comprises a first ramping stage 310, a constant load stage 320, and a second ramping stage 330. The ramping load cycle profile is characterized by the following features: the load change, denoted in the figure by the arrow "LC"; and the rate of load change, denoted in the figures by slope "S" of the ramping stage. The duration of the constant load stage 320 is illustrated by the arrow "D". Constant load cycle profries are either "flat-up" (illustrated in FIG. 3(E)), or "flat-down" (FIG. 3(F)).

Each constant load cycle profiles comprise a constant load stage 350 and a subsequent ramping load stage 360. The constant load cycle profile is characterized by features such as the present load of the constant load stage 350, denoted in the figures by "L"; the duration "D" of constant load stage 350; the rate of load change "S" during subsequent ramping stage 360 and the final load "L" at the conclusion of subsequent ramping stage 360.

For a particular composite electrical-load profile, fuzzy logic controller 230 generates a plurality of weighted operating constraints that weight and prioritize various steam plant operating parameters. For example, the weighted operating constraints comprise load tracking (e.g., the weight or importance to be assigned to controlling the steam system components to track the anticipated generator load); turbine temperature fluctuation (the weight to be assigned to minimizing changes in turbine inlet temperature, thus minimizing stress on the turbine); control valve movement; the importance of steam pressure change (the latter two operating constraints are used to control the optimization of energy delivery to the turbine through boiler pressure control or throttling of the turbine steam supply.); a target steam pressure (for the endpoint of each constant load stage so that the system is in the optimum position to handle the next load change in a cost effective manner with minimal turbine stress); and the prioritization weight to achieving the target steam pressure within the period of the constant load stage.

The hybrid fuzzy logic-model predictive control functions of controller 200 provide an optimal combination of fixed and sliding steam pressure control to produce steam plant control with good load tracking and reduced thermal stress on one or more selected steam system components (e.g., to attempt to minimize thermal stress on the turbine). Composite ramping load profiles are used in the fuzzy inferen calculation to respond to immediate cycling demand and to prepare for subsequent cycling. Composite constant load profiles are used to modify the current system state, while maintaining constant load, to a desired state for executing the next predicted load change. For example, in a composite profile in which a constant low load stage is followed by a fast increase in load to a high load, it is desirable to increase boiler potential energy (e.g., increasing steam pressure) to optimally handle the next load change.

The fuzzy inference calculation applies predetermined fuzzy inference rules to weight the respective operational constraints supplied to the model predictive controller. One example of a set of fuzzy logic rules for fuzzy logic controller 230 are set forth in Tables 1 through 4 below. The various weights assigned to the respective operational constraints are qualitatively presented in the rule tables; in accordance with known practices in the field of fuzzy logic, such semantics correspond to quantitative values between 0 and 1, with the application of particular rules and the exact values applied being determined by the system designer to provide the optimal system performance (e.g., to mimic and improve upon heuristically-determined operator control actions in the plant).

The generation of the weighted operating constraints in fuzzy logic controller 230 comprises assigning membership functions to features of respective load cycle profiles. For example, the duration (or "dwell") of a constant load stage is defined to be short (denoted "S" in the tables below) or long (denoted "L" in the tables below); loading rates are defined as slow (denoted "S" in the tables below) or fast (denoted "F" in the tables below), load changes are defined as small or large; loading rates are defined as slow or fast; and loads are defined as low, medium, or large. Similarly, load transition types (denoted "TRANS" in the tables below) are defined for the ramping load groups as follows:

SS: Slow rate and Small load change;

FS: Fast rate and Small load change;

SB: Slow rate and Big load change; and

FB: Fast rate and Big load change.

S: Slow rate with either a small or big load change

F: Fast rate with either a small or big load change

The definition of these membership functions is based on percentage of full load capacity of a steam plant and thus are portable from one plant to another.

For example, Tables 1–4 below provide fuzzy logic rules for the abovementioned membership functions for features of a particular selected load profile. In addition, the tables provide the weight assigned to the operating constraints that are the output of fuzzy logic controller 230. In particular, the following shorthand terminology is used:

Gload: priority assigned to load following;

Gtemp: priority assigned to minimizing temperature variations;

Bvalve: Priority assigned to restricting valve movement;

Bpres: Priority assigned to restricting steam pressure changes;

Ptrak: Priority to obtain the calculated pressure at the conclusion of the constant load stage (Table 4 only); and Prend: desired pressure at conclusion of constant load stage (expressed in % of max operating pressure) (Table 4 only).

All priorities are expressed as High (H), Medium (M), or Low (L).

Table 1 sets forth the rules for ramping load cycle profiles "UP-FLAT-UP" and "DOWN-FLAT-DOWN":

TABLE 1

| TRANS$_1$ | DWELL | TRANS$_2$ | GLOAD | GTEMP | BVALVE | BPRESS |
|---|---|---|---|---|---|---|
| SS | S | S | ALL H | M | H | L |
|  |  | F |  | M | M | M |
|  | L | Either |  | M | M | M |
| SB | S | S |  | M | M | L |
|  |  | F |  | M | H | L |
|  | L | Either |  | M | M | L |
| FS | S | S |  | M | M | M |
|  |  | FS |  | M | M | L |
|  |  | FB |  | M | H | L |
|  | L | Either |  | M | M | M |
| FB | S | S |  | L | L | M |
|  |  | FS |  | L | M | M |
|  |  | FB |  | L | M | L |
|  | L | Either |  | L | M | M |

Table 2 sets forth the rules for the ramping load cycle profile "UP-FLAT-DOWN":

TABLE 2

| TRANS$_1$ | DWELL | TRANS$_2$ | GLOAD | GTEMP | BVALVE | BPRESS |
|---|---|---|---|---|---|---|
| SS | S | S | ALL H | H | M | L |
|  |  | F |  | H | M | M |
|  | L | Either |  | H | M | L |
| SB | S | SS |  | M | M | L |
|  |  | SB |  | H | M | L |
|  |  | FS |  | M | M | M |
|  |  | FB |  | H | M | M |
|  | L | Either |  | H | M | L |
| FS | S | S |  | M | M | M |
|  |  | F |  | M | L | M |
|  | L | Either |  | M | M | L |
| FB | S | S |  | L | L | M |
|  |  | FS |  | L | L | M |
|  |  | FB |  | L | L | H |
|  | L | Either |  | L | L | L |

Table 3 sets forth the rules for the ramping load cycle profile "DOWN-FLAT-UP":

TABLE 3

| TRANS₁ | DWELL | TRANS₂ | GLOAD | GTEMP | BVALVE | BPRESS |
|---|---|---|---|---|---|---|
| SS | S | S | ALL H | H | H | L |
|  |  | F |  | H | M | M |
|  | L | Either |  | H | M | L |
| SB | S | SS |  | M | M | L |
|  |  | SB |  | H | M | L |
|  |  | FS |  | M | M | H |
|  |  | FB |  | H | M | H |
|  | L | Either |  | H | M | M |
| FS | S | S |  | M | M | M |
|  |  | FS |  | M | L | M |
|  |  | FB |  | H | L | H |
|  | L | Either |  | M | M | M |
| FB | S | S |  | L | L | M |
|  |  | FS |  | L | L | M |
|  |  | FB |  | L | L | H |
|  | L | Either |  | L | L | M |

Table 4 sets forth the rules for the constant load profiles "FLAT-UP" and "FLAT-DOWN":

TABLE 4

| LOAD | DWELL | RATE | LOAD1 | PTRAK | PREND | GLOAD | GTEMP | BVALVE | BPRESS |
|---|---|---|---|---|---|---|---|---|---|
| L | S | F | L | H | 20 | ALL H | H | M | M |
|  |  |  | M | H | 50 |  | M | M | L |
|  |  |  | H | H | 80 |  | L | H | L |
|  |  | S | L | M | 10 |  | M | M | M |
|  |  |  | M | M | 40 |  | M | L | M |
|  |  |  | H | M | 70 |  | M | L | H |
|  | L | F | L | M | 20 |  | H | M | M |
|  |  |  | M | M | 50 |  | H | M | M |
|  |  |  | H | M | 80 |  | H | H | M |
|  |  | S | L | L | 10 |  | H | M | M |
|  |  |  | M | L | 40 |  | H | M | M |
|  |  |  | H | L | 70 |  | M | M | L |
| M | S | F | L | L | 40 |  | M | M | L |
|  |  |  | M | M | 50 |  | H | M | M |
|  |  |  | H | H | 80 |  | M | M | L |
|  |  | S | L | L | 40 |  | M | M | M |
|  |  |  | M | L | 40 |  | H | L | L |
|  |  |  | H | L | 40 |  | M | M | M |
|  | L | F | L | L | 40 |  | H | M | L |
|  |  |  | M | L | 40 |  | H | L | L |
|  |  |  | H | M | 80 |  | H | M | L |
|  |  | S | L | L | 40 |  | H | M | M |
|  |  |  | M | L | 40 |  | H | L | L |
|  |  |  | H | L | 40 |  | H | M | M |
| H | S | F | L | H | 80 | ALL H | L | H | M |
|  |  |  | M | M | 80 |  | M | M | L |
|  |  |  | H | L | 80 |  | H | M | M |
|  |  | S | L | L | 80 |  | M | H | M |
|  |  |  | M | L | 80 |  | M | H | M |
|  |  |  | H | L | 80 |  | H | H | M |
|  | L | F | L | L | 80 |  | M | H | L |
|  |  |  | M | M | 80 |  | H | M | L |
|  |  |  | H | L | 80 |  | H | M | M |
|  |  | S | L | L | 80 |  | H | H | L |
|  |  |  | M | L | 80 |  | H | H | L |
|  |  |  | H | L | 80 |  | H | H | L |

The weighted operating constraints determined in accordance with the fuzzy logic rules are provided to model predictive controller 250 to be used in generating the steam plant operating signals. The model predictive controller employs a mathematical model of the steam plant that, given the specified fuzzy logic-generated operating constraints and input information, generates a sequence of control signals to achieve a desired steam plant operation trajectory (e.g., following load changes) in a manner that is both cost effective and that minimizes stress.

The optimization technique used by the model predictive controller is quadratic dynamic matrix control. In this technique, a cost function J is minimized, as expressed in the following quadratic program (QP):

$$\min_{x(k)}\{J\} = \min_{x(k)} \left\{ \frac{1}{2} x(k)^T H x(k) - g(k+1)x(k) \right\}$$

Solving the QP at each time k produces a vector sequence x(k), which are the optimal controller setpoints for tracking the desired trajectory at minimal cost. The QP matrix H contains the plant model or "dynamic matrix" A, the actuator weighting matrix Λ, and plant output weighting matrix Γ. H is given by $H = A^T\Gamma^T\Gamma A + \Lambda^T\Lambda$ The QP gradient vector g(k+1) is given by $g(k+1) = A^T\Lambda^T\Lambda(k+1)$ where the vector e(k+1) is the desired system trajectory tracking error.

Weights in Λ correspond to the system trajectory tracking errors in e(k+1) and the relative magnitude of these weights determines the priority the QDMC algorithm places on reducing particular errors to zero. Each weight in the matrix Λ corresponds to a system actuator in x(k). The relative magnitude of these weights determines the degree to which each actuator is used in minimizing the errors in e(k+1). These cost function weights are provided by the fuzzy logic knowledge base.

In operation, the method of the present invention provides for comparing current turbine loading with an anticipated electrical load profile to generate a load error signal to be supplied to model predictive controller 250. The anticipated electrical load profile corresponds to the time of day, day of the week, month of the year, and historical data; operator input can vary an anticipated load profile as appropriate for unusual or emergency situations. The anticipated load profile is categorized with respect to selected composite electrical load profiles; weighted operating constraints are then generated in fuzzy logic controller 230 by means of a fuzzy inference calculation using the selected electrical cycle profiles. Control signals for selected steam plant regulatory functions, such as steam supply valve position and boiler pressure, are produced by applying the fuzzy logic-generated weighted operating constraints and the load error signal so as to optimize turbine load-following efficacy, steam plant efficiency, and machinery stress reduction. These control signals are then applied to respective regulatory function actuators in the steam plant to implement the desired trajectory of steam plant operation.

While only certain features of the invention have been illustrated and described herein, many modifications and changes will occur to those skilled in the art. It is, therefore, to be understood that the appended claims are intended to cover all such modifications and changes as fall within the true spirit of the invention.

What is claimed is:

1. A method using fuzzy logic for cyclic operation control of a steam turbine, the method comprising the steps of:

categorizing current turbine operation with respect to selected composite electrical-load cycle profiles, each of said electrical-load cycle profiles comprising multiple sequential load stages corresponding to phases of a predicted turbine loading profile; and producing control signals for selected steam plant regulatory functions by means of a fuzzy inference calculation in accordance with the categorization of turbine operation with respect to said selected composite electrical-load cycle profiles such that turbine operation is optimized.

2. The method of claim 1 further comprising the step of applying said control signals for said selected steam plant regulatory functions to respective function controllers.

3. The method of claim 1 wherein the step of producing control signals for selected steam plant regulatory functions further comprises generating weighted values of selected cycle features and applying said respective weighted values of the cycle features to a model predictive controller so as to generate steam plant control signals.

4. The method of claim 3 wherein said steam plant control signals comprise a steam supply valve control signal and a steam pressure control signal.

5. The method of claim 4 wherein said selected composite electrical-load cycle profiles comprise a constant load cycle profile and a ramping load cycle profile 6. The method of claim 5 wherein each constant load cycle profile comprises a constant load stage followed by a ramping load stage, and each ramping load cycle profile comprises a first ramping load stage followed by a constant load stage followed by a second ramping load stage.

7. The method of claim 3 wherein the step of producing said steam plant control signals further comprises optimizing said signals in accordance with selected criteria.

8. The method of claim 7 wherein the step of optimizing said steam plant control signals comprises minimizing load tracking error and minimizing turbine inlet temperature changes.

9. The method of claim 8 wherein the step of optimizing said steam plant control signals further comprises prioritizing respective control signals for steam pressure and for turbine steam supply valve position.

10. A method for controlling a turbine in a steam plant using fuzzy logic such that future projected load demand is considered in determining current turbine control action so as to respond to cycling loads in an optimal fashion, the method comprising the steps of:

comparing current turbine loading with selected composite electrical-load cycle profiles to generate a load error signal, each of said electrical cycle profiles comprising multiple sequential load stages corresponding to phases of a predicted turbine loading profile;

generating weighted operating constraints by means of a fuzzy inference calculation in correspondence with selected ones of said electrical cycle profiles;

producing control signals for selected steam plant regulatory functions by applying said weighted operating constraints and said load error signal so as to optimize turbine load-following efficacy, steam plant efficiency, and machinery stress reduction; and applying the steam plant regulatory control signals to respective regulatory function actuators in said steam plant.

11. The method of claim 10 wherein said steam plant regulatory control signals comprise a steam supply valve control signal and a steam pressure control signal.

12. The method of claim 11 wherein the step of generating weighted operating constraints comprises the steps of assigning a weight value to each the following operating constraints: load tracking; turbine temperature fluctuation; control valve movement; and steam pressure change.

13. The method of claim 12 wherein said selected composite electrical-load cycle profiles comprise a constant load cycle profile and a ramping load cycle profile 14. The method of claim 13 wherein each constant load cycle profile comprises a constant load stage followed by a ramping load stage, and each ramping load cycle profile comprises a first ramping load stage followed by a constant load stage in turn followed by a second ramping load stage.

15. The method of claim 14 wherein the step of generating weighted operating constraints further comprises, for each constant load stage of a constant load cycle profile, the steps of generating a target steam pressure for the endpoint of said constant load stage and a prioritization weight on reaching said target steam pressure prior to the endpoint of said constant load stage.

16. The method of claim 15 wherein the step of generating weighted operating constraints by means of a fuzzy inference calculation further comprises assessing each of a plurality of features of respective stages of said selected composite electrical-load cycle profiles, said features comprising for a constant load stage turbine load level, a constant load stage duration; a ramping load stage turbine loading rate; and a ramping load stage overall turbine load change.

17. The method of claim 10 wherein the step of comparing current turbine loading with a predicted electrical-load profile comprises determining at least one appropriate selected composite electrical-load cycle profile.

18. The method of claim 17 wherein the step of determining at least one appropriate selected electrical-load cycle profile further comprises selecting an applicable constant load cycle profile and selecting an applicable ramping load cycle profile.

19. The method of claim 18 wherein said predicted electrical load for said turbine corresponds to time of day, day of the week, and time of year.

20. The method of claim 18 wherein said predicted electrical load for said turbine further corresponds to an operator input of factors affecting turbine loading.

21. A steam plant controller for controlling cyclic operation of the steam plant in response to changes in electrical load demand on a turbine generator unit in said plant, comprising:

a boiler controller comprising means for selectively adjusting the steam pressure delivered to said turbine generator unit;

a steam supply control apparatus coupled to said turbine generator unit so as to selectively control the amount of steam admitted into the turbine; and a steam plant cyclic controller coupled to said boiler controller and said steam supply control apparatus, said steam plant cyclic controller comprising means for generating control signals for said boiler controller and said steam supply control apparatus so that selected steam plant operation parameters are optimized with respect to an anticipated load profile by means of a fuzzy inference calculation.

22. The controller of claim 21 wherein said means for generating control signals comprises a load demand prediction circuit, a model predictive controller coupled to said load demand prediction circuit to receive a load error signal therefrom, and a fuzzy logic circuit coupled to said load demand prediction circuit to receive a selected composite electrical load profile signal therefrom, said model predictive controller further being coupled to said fuzzy logic circuit to receive a fuzzy logic-generated weighted operational constraint signal therefrom.

23. The controller of claim 22 wherein said load demand prediction circuit comprises:

means for determining an anticipated electrical load profile based on temporal information;

means for categorizing said anticipated electrical load profile with respect to selected composite electrical load cycle profiles and to generate said composite electrical load cycle profile signal.

24. The controller of claim 23 wherein said fuzzy logic circuit comprises means for generating a plurality of operating constraint signals in correspondence with predetermined fuzzy logic rules, said operating constraint signals comprising a load tracking weighting signal and a turbine inlet temperature fluctuation weighting signal.

25. The controller of claim 24 wherein said fuzzy logic circuit further comprises means for generating a weighted steam supply apparatus control signal, a weighted boiler pressure control signal, a target steam pressure signal and a prioritization weight signal for achieving said target steam pressure.

26. The controller of claim 22 wherein said model predictive controller comprises means for optimizing the boiler pressure control signal and the steam supply control signal in correspondence with said weighted operating constraits.

27. The controller of claim 21 wherein said steam supply apparatus comprises a turbine throttle valve.

* * * * *